No. 776,931. Patented December 6, 1904.

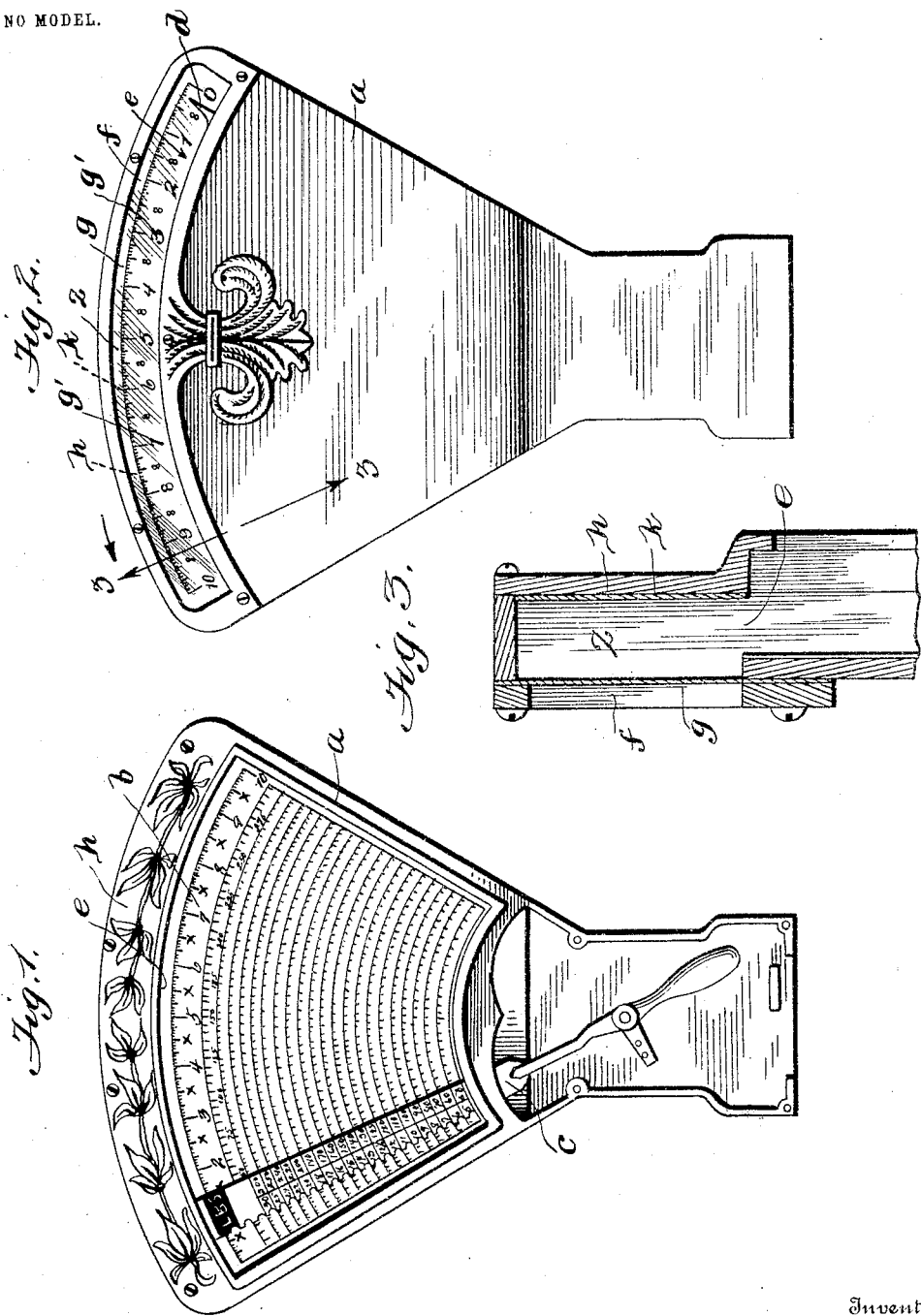

UNITED STATES PATENT OFFICE.

JOHN H. OSBORNE, OF ANDERSON, INDIANA.

SCALE-DIAL.

SPECIFICATION forming part of Letters Patent No. 776,931, dated December 6, 1904.

Application filed June 23, 1904. Serial No. 213,852. (No model.)

*To all whom it may concern:*

Be it known that I, JOHN H. OSBORNE, a citizen of the United States, and a resident of Anderson, in the county of Madison and State of Indiana, have made a certain new and useful Invention in Scale-Dials; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a view of the rear part of the invention. Fig. 2 is a view of the front part of the same. Fig. 3 is a sectional view of a part of the device on line 3 3 of Fig. 2.

The invention has relation to the indicator-scales of weighing-machines, and particularly to arc-form scales which are combined with pivoted radial index-arms; and the invention consists in the novel construction and combinations of parts as hereinafter set forth.

In the accompanying drawings, illustrating the invention, the letter $a$ designates a part of the frame of the weighing-machine which carries the graduated scale $b$. This portion of the frame is upright and is provided with a bearing for the pivot of the indicator-arm $c$, the extremity of which forms the index-pointer $d$. The scale part $a$ of the frame is usually of sector form, as shown, and its upper portion is provided with an arc-form box $z$, open below at $e$ and in front at $f$, the latter opening being usually a circular slot in the top portion of the sector-form frame above the scale $b$. The front opening $f$ is designed to be in the plane of the scale $b$, or very nearly so, and it is provided with a transparent sheet or plate $g$, which may be of celluloid or glass, the celluloid being preferred on account of its thin character. The arc-boxing $z$, therefore, is provided with a front transparent wall $g$ and with a back wall $h$, between which the index-pointer of the indicator-arm plays when the scale is in use. The back wall $h$ is usually provided with a lining $k$ of light or dark character in contrast with the color of the index-pointer and the scale of sheet $g$, so that the position of the latter can be readily distinguished. This index-pointer moves close to the transparent wall $g$ as the indicator-arm moves close to the scale $b$, which is in the plane of said transparent wall, or very nearly so. The transparent wall is graduated with proper marks and figures $g'$ on its inside surface to constitute a scale which corresponds to the scale $b$, so that while the latter scale serves for the dealer the scale $g'$ serves for the customer and its figures therefore increase in significance from right to left. As the dealer is accustomed to his scale, the arrangement for accurate reading is not so important as in that of the customer's scale, and on this account the transparent scale of thin character is employed having the figures and markings of the scale on the transparent material. As the indicator-arm works close to the scale $b$ and its index-pointer therefore close to the transparent scale $g'$, which is in or approximately in the plane of said scale $b$, the reading is clearly and accurately brought out to the customer, not only by the contrast between the coloring of the index-pointer and that of the lining at the back of the arc box, but also because of the proximity of the index-pointer to the transparent scale, which is designed to avoid the errors which commonly occur through optical illusion when there is some distance between the index-point and the figures and markings of the scale.

Having thus described my invention, what I claim as new, and desire to secure by Letters Patent, is—

In a price-scale, a sector-form boxing having a lower rear opening and an upper front opening above said rear opening, a lower merchant's scale of sector form an upper arc-form transparent scale-plate seated in said front opening carrying the figures of a customer's scale, and lying approximately in the same plane as said merchant's scale, a movable pointer for said scales and a contrasting lining in rear of said transparent plate and pointer and visually distinguished from said pointer and the figures of the transparent scale, substantially as specified.

In testimony whereof I affix my signature in presence of two witnesses.

JOHN H. OSBORNE.

Witnesses:
G. H. LOCKWOOD,
GEO. W. SPENCER.